Figure 1:
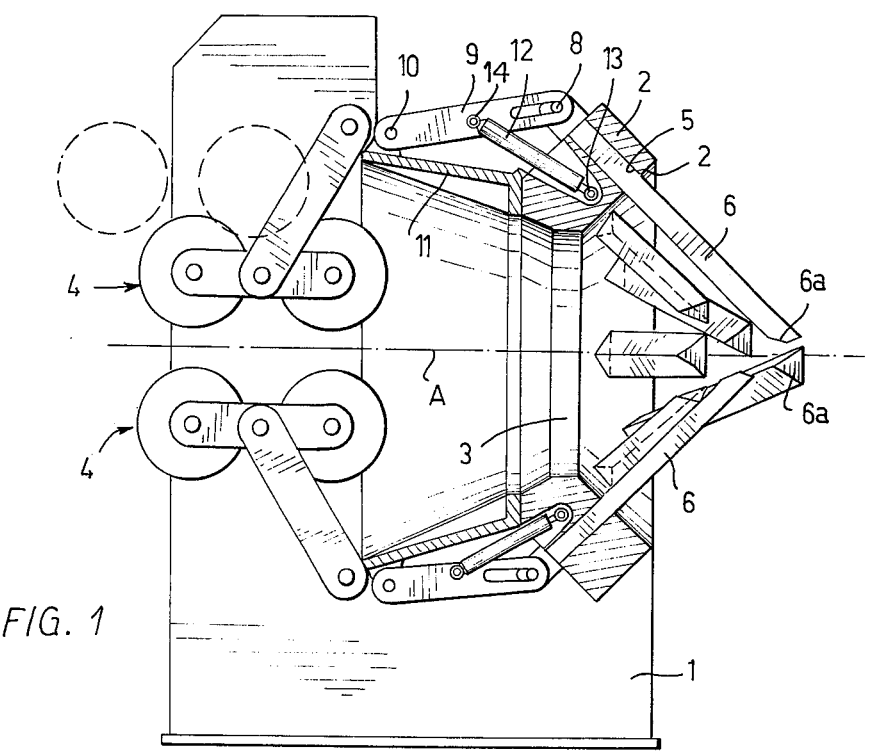

United States Patent [19]
Valo

[11] 4,050,485
[45] Sept. 27, 1977

[54] LOPPING MACHINE FOR STEMS OF TREES

[76] Inventor: Antti Tapani Valo, 08100, Lohja 10, Finland

[21] Appl. No.: 676,598

[22] Filed: Apr. 13, 1976

[30] Foreign Application Priority Data

May 5, 1975 Finland ............................ 75/1319

[51] Int. Cl.² .............................................. B27L 1/00
[52] U.S. Cl. .................................. 144/2 Z; 144/208 E
[58] Field of Search .................. 144/2 Z, 3 D, 208 R, 144/208 E, 309 A, 309 C, 311

[56] References Cited

U.S. PATENT DOCUMENTS

| 2,534,595 | 12/1950 | Hamilton | 144/208 E X |
| 2,623,558 | 12/1952 | Andersson | 144/208 E |
| 2,756,786 | 7/1956 | Valo | 144/208 E |
| 3,092,158 | 6/1963 | Ellerman et al. | 144/208 E X |
| 3,690,351 | 9/1972 | Strickland et al. | 144/2 Z |

Primary Examiner—Willie G. Abercrombie
Assistant Examiner—W. D. Bray
Attorney, Agent, or Firm—Ladas, Parry, Von Gehr, Goldsmith & Deschamps

[57] ABSTRACT

A lopping machine comprising a ring-shaped holder forming a central opening and a number of lopping rods slidably supported by said holder and circumferentially spaced around said opening. The lopping rods are positioned in axial planes of said holder opening and are inclined with respect to the axis of said opening, so that the inner ends of the rods contact the surface of a tree stem passing longitudinally through said opening. Each rod is provided with displacing means for retracting said inner ends of the rods beyond a wiping surface formed in said holder for removing branches sticking to said rods.

4 Claims, 2 Drawing Figures

LOPPING MACHINE FOR STEMS OF TREES

The subject of the present invention is a lopping machine for stems of trees, which machine comprises an annular holder frame provided with a central opening for longitudinal passing through of the tree stem to be lopped as well as a number of rod-shaped lopping units, which are placed around said opening with mutual distances and which are movably mounted on the holder frame so as to follow the tree stem to be lopped and, as to their lopping edges, directed radially towards the center of the opening diagonally against the direction of movement of the tree stem.

Various lopping machines for mechanical lopping of tree stems are previously known, in which the tree stem and an annular holder frame are supposed to be brought into movement in relation to each other in the longitudinal direction of the tree stem, whereby a number of lopping units radially extending towards the tree stem are movably mounted on the holder frame. In such a case it is possible either to move the holder frame along a stationary tree stem or to feed the tree stem longitudinally through a stationary holder frame. In both cases the lopping units follow the surface of the tree stem and lop off any branches coming in their way.

A major drawback of the lopping machines previously known has been the tendency of the machine to be blocked, because the lopped branches tend to penetrate in between the individual edges and to get stuck in the system of edges of the machine. This causes interruptions in operation, because the stuck branches must be pulled off by hand. In order to prevent the branches from getting stuck, it has been suggested previously that the lopping units be fastened behind a disk-shaped holder supporting them in order to protect the lopping units. Such an embodiment, however, hampers the free contact of the lopping units with the branches to be lopped off and, on the other hand, causes the branches getting stuck in the feed opening itself.

The object of the present invention is to provide a lopping machine that prevents the branches lopped off from getting stuck permanently in and between the lopping units, and this object is achieved by means of a lopping machine in accordance with the present invention, which is characterized by a wiping surface, beyond which the lopping units are designed as movable together with their lopping edges so as to make them free from branches and equivalent that have gotten stuck.

According to the invention, a lopping machine of a very simple construction is provided, which gives the possibility at necessary intervals to wipe the lopping units clean from lopped branches that may have gotten stuck in and between the lopping units. In this way it is possible to ensure satisfactory performance of the lopping work and to avoid interruptions of operation resulting from blocking of the machine. Since the cleaning of the lopping units is performed mechanically by momentarily pulling the lopping units into their inward positions and by thereby shifting their lopping edges beyond said wiping surface, such wiping-clean can be performed rapidly, for example, always after the passing-through of each lopped stem of tree without having to interrupt the feeding of the stems of trees.

An advantageous embodiment, in which the holder frame is shaped as conical and as becoming narrower in the direction of movement of the stem to be lopped, is characterized in that the mantle face of the holder frame which has the shape of a truncated cone and is placed towards the stem of tree constitutes said wiping surface.

Figure 2:
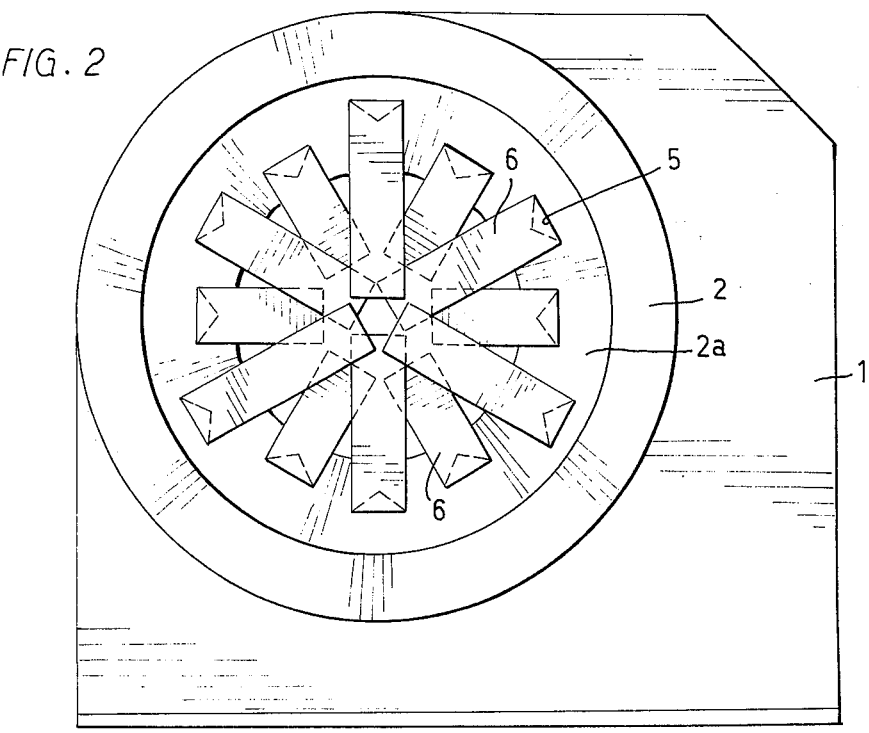
Figure 3:
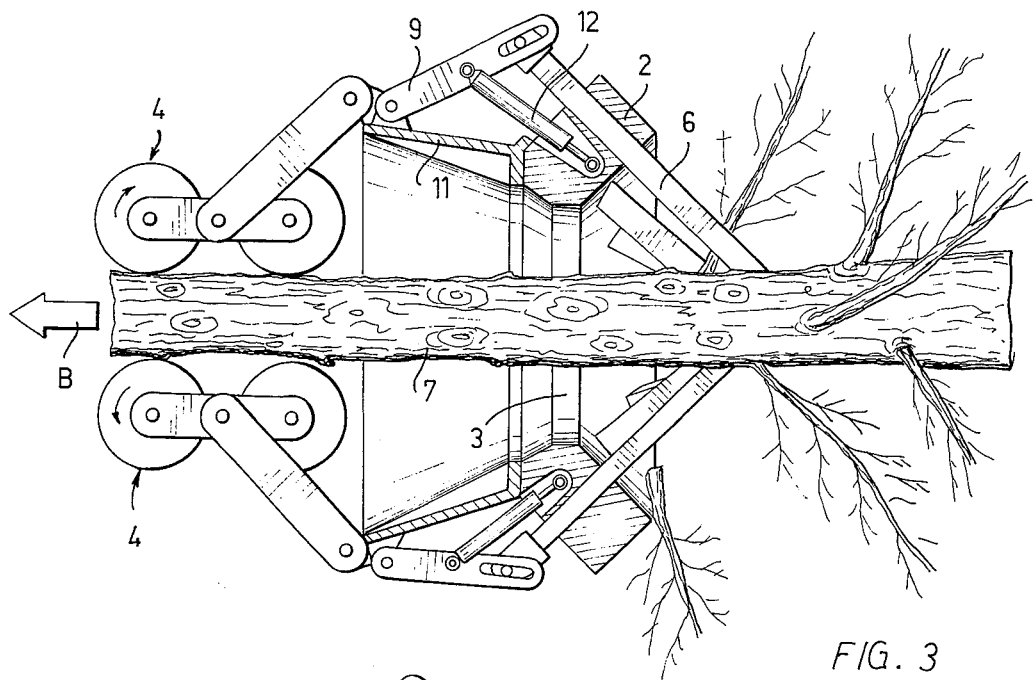
Figure 4:
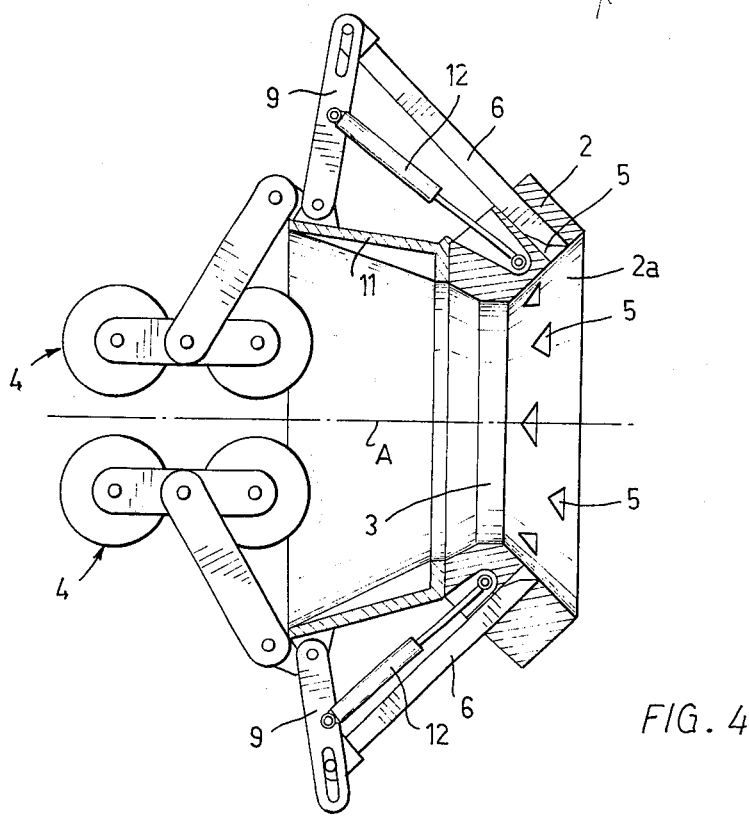

The invention will be described more closely below with reference to the attached drawings, wherein FIG. 1 shows, as a side view, an axial section of a favourable embodiment of the lopping machine in accordance with the invention, FIG. 2 shows the lopping machine as viewed from the end, FIG. 3 shows the lopping machine in the working position, and FIG. 4 shows the lopping machine in the cleaning position.

The lopping machine shown in the drawing comprises, as mounted on the body 1, a holder frame 2, which is provided with a horizontal through feed opening 3 for longitudinal feeding-through of the stem of the tree to be lopped. For the purpose of feeding the tree stem through the machine, the machine is provided with feeding rollers 4 which are supported by pivoting arms mounted on the body and which are driven by a transmission mechanism not shown.

In through guides 5 shaped in the holder frame, rod-shaped lopping units 6 are glidably mounted so that the lopping units are directed, as viewed in the direction of the center axis A of the feeding opening (FIG. 2), radially towards the center axis of the opening and, as viewed in the axial section (FIG. 1), towards each other diagonally against the direction of movement B of the stem 7 (FIG. 3). The lopping units are hereby placed in several groups positioned axially one after the other, which groups are placed, as viewed in the direction of the center axis of the feeding opening, as shifted overlapping each other so that the edges 6a of the lopping units together surround the stems to be lopped completely within a very wide range of diameters. In the embodiment shown, the holder frame is shaped as conical and as becoming narrower in the direction of movement of the stem of tree to be looped, whereby the lopping units are arranged so that they extend substantially perpendicularly towards the mantle face 2a of the shape of a truncated cone of the holder frame, facing towards the stem. Each lopping unit 6 is at its outer end, by means of a sliding pivot joint 8, connected to a shifting arm 9, which is, by means of a pivot joint 10, connected to a support 11 fastened to the holder frame. The hydraulic cylinder 12 is, by means of a pivot joint 13, connected to the holder frame and, by means of a pivot joint 14, to the shifting arm 9. The arrangement is hereby such that each lopping unit can be, by means of the hydraulic cylinder and the shifting arm, pulled outwards in its guide 5 to such an extent that the edge 6a of the lopping unit comes to be pulled preferably entirely into the guide, as is illustrated in FIG. 4.

Due to the fact that, in accordance with the invention, the lopping units with their lopping edges 6a can be pulled into the guides 5 in the holder frame, the lopping units can be, simply and rapidly, wiped clean of any lopped branches sticking to them, by means of the mantle face 2a of the holder frame. In this way, any sticking branches can fall off. Hereupon the lopping units are again pressed out to their working position by means of hydraulic cylinders. The hydraulic cylinders can also be used for pulling the lopping units aside for the purpose of introducing a stem of tree in contact with the feeding rollers 4. The hydraulic cylinders may also be designed so that they apply a counterpressure of a certain magnitude to the lopping units during the loping stage so that the lopping blades smoothly follow the variations in the surface of the stem of tree to be lopped.

The drawing and the related specification are only intended to illustrate the idea of the invention. In its details the lopping machine in accordance with the invention may show even considerable variability within the scope of the claims. Thus, the holder frame can differ from the shape described above, and the wiping face may consist of a separate annular disk of the shape of truncated cone and fastened to said holder frame, through which disk the lopping units extend. Instead of each lopping unit being provided with a hydraulic cylinder of its own, the lopping units may be, for example by spring means, connected to common shifting means so as to reduce the number of the hydraulic cylinders. Likewise, the lopping units may be mounted to the holder frame in some other way except as gliding. Even, though it is presented in the drawing that the lopping units are pulled so deep into the guides in the holder frame that the edges of the lopping units are all pulled into the guides up to their tips, it is evident that it may usually be sufficient that the lopping units are wiped clean only up to the proximity of the tips of the blades so that the blades still partly project from the guides.

What I claim is:

1. A lopping machine for stems of trees, which machine comprises an annular holder frame having an interior surface bounding a central opening for longitudinal passing of a tree stem to be lopped, said interior surface being frusto-conical and its diameter decreasing in the direction of movement of the tree stem, and a plurality of lopping rods each having a cutting end, said lopping rods being mounted in said annular holder frame with the cutting ends spaced apart from one another about the central opening and with each lopping rod being directed towards the central axis of the opening obliquely against the direction of movement of the tree stem, and each lopping rod being slidable in the axial direction thereof between a lopping position in which its cutting end projects through said interior surface into said central opening and a retracted position in which its cutting end is withdrawn from the central opening to a position beyond said interior surface, and the machine also comprising means connected to said rods for displacing said rods forcibly from said retracted position to said lopping position to engage a tree stem and for displacing said rods forcibly from said lopping position to said retracted position to wipe the rods free of branches and the like on movement through said interior surface.

2. A lopping machine as claimed in claim 1, wherein the lopping rods extend substantially perpendicular to said interior surface.

3. A lopping machine as claimed in claim 1, wherein each lopping rod has an outer end remote from its cutting end, and said means connected to said rods comprise, in respect of each rod, a shifting arm which is mounted pivotally on said holder frame and is pivotally connected to said outer end of the lopping rod, and a hydraulic cylinder connected to the shifting arm to bring about pivotal movement thereof in opposite directions about its pivotal connection to the annular holder frame, thereby to bring about forcible displacement of the rod from its retracted position to its lopping position and from its lopping position to its retracted position.

4. A lopping machine as claimed in claim 1, further comprising drive means mounted upon said annular holder frame for gripping a tree stem and passing it through the central opening in said direction of movement of the tree stem.

* * * * *